United States Patent
Tuduki et al.

(10) Patent No.: US 10,535,877 B2
(45) Date of Patent: *Jan. 14, 2020

(54) NON-AQUEOUS ELECTROLYTE SECONDARY BATTERY

(71) Applicant: PANASONIC INTELLECTUAL PROPERTY MANAGEMENT CO., LTD., Osaka-shi, Osaka (JP)

(72) Inventors: Kouhei Tuduki, Hyogo (JP); Atsushi Fukui, Hyogo (JP); Katsunori Yanagida, Hyogo (JP)

(73) Assignee: Panasonic Intellectual Property Management Co., Ltd., Osaka-shi (JP)

(*) Notice: Subject to any disclaimer, the term of this patent is extended or adjusted under 35 U.S.C. 154(b) by 91 days.

This patent is subject to a terminal disclaimer.

(21) Appl. No.: 15/736,066

(22) PCT Filed: Sep. 20, 2016

(86) PCT No.: PCT/JP2016/004272
§ 371 (c)(1),
(2) Date: Dec. 13, 2017

(87) PCT Pub. No.: WO2017/056448
PCT Pub. Date: Apr. 6, 2017

(65) Prior Publication Data
US 2018/0183042 A1 Jun. 28, 2018

(30) Foreign Application Priority Data
Sep. 30, 2015 (JP) .................. 2015-192535

(51) Int. Cl.
| | |
|---|---|
| *H01M 4/587* | (2010.01) |
| *H01M 4/583* | (2010.01) |
| *H01M 4/36* | (2006.01) |
| *H01M 4/62* | (2006.01) |
| *H01M 10/0525* | (2010.01) |
| *H01M 4/48* | (2010.01) |
| *H01M 4/133* | (2010.01) |
| *H01M 4/38* | (2006.01) |
| *H01M 4/58* | (2010.01) |
| *H01M 4/02* | (2006.01) |

(52) U.S. Cl.
CPC .......... *H01M 4/587* (2013.01); *H01M 4/133* (2013.01); *H01M 4/366* (2013.01); *H01M 4/38* (2013.01); *H01M 4/483* (2013.01); *H01M 4/583* (2013.01); *H01M 4/5825* (2013.01); *H01M 4/62* (2013.01); *H01M 4/622* (2013.01); *H01M 4/625* (2013.01); *H01M 10/0525* (2013.01); *H01M 2004/027* (2013.01); *H01M 2004/028* (2013.01); *H01M 2220/20* (2013.01); *Y02T 10/7011* (2013.01)

(58) Field of Classification Search
CPC ...... H01M 4/587; H01M 4/583; H01M 4/133; H01M 4/62; H01M 4/622; H01M 4/625; H01M 4/366; H01M 4/5825; H01M 10/0525; H01M 2220/20; H01M 2004/027; H01M 2004/028; Y02T 10/7011
See application file for complete search history.

(56) References Cited

U.S. PATENT DOCUMENTS 8,986,880 B2 * 3/2015 Odani .................. H01M 4/134
429/199

FOREIGN PATENT DOCUMENTS

| | | |
|---|---|---|
| JP | 2003-346804 A | 12/2003 |
| JP | 2011-204576 A | 10/2011 |
| JP | 2013-12394 A | 1/2013 |
| JP | 2014-49229 A | 3/2014 |
| WO | 2006/019245 A1 | 2/2006 |

OTHER PUBLICATIONS

International Search Report dated Dec. 20, 2016, issued in Counterpart of International Application No. PCT/JP2016/004272 (1 page).

* cited by examiner

*Primary Examiner* — Laura Weiner

(57) ABSTRACT

A non-aqueous electrolyte secondary battery includes a non-aqueous electrolyte and an electrode body in which a positive electrode plate and a negative electrode plate are layered with a separator interposed therebetween. The positive electrode plate contains a phosphate compound. The negative electrode plate contains a graphite-based material, an amorphous/non-crystalline carbon material, and a rubber-based binder. The ratio of the coverage of the rubber-based binder on the amorphous/non-crystalline carbon material to the coverage of the rubber-based binder on the graphite-based material is more than 0 and 0.5 or less.

6 Claims, No Drawings

NON-AQUEOUS ELECTROLYTE SECONDARY BATTERY

TECHNICAL FIELD

The present disclosure relates to non-aqueous electrolyte secondary batteries.

BACKGROUND ART

There is a need to improve the output characteristics of non-aqueous electrolyte secondary batteries mainly in applications of power sources for, for example, electric vehicles (EVs), hybrid electric vehicles (HEVs), and power tools.

Patent Literature 1 discloses that the use of an electrode containing inorganic particles (e.g., $Li_3PO_4$) having an ability to transfer lithium ions suppresses the reaction between the electrode active material and the electrolyte solution on the surface of the electrode and improves the safety at the time of overcharging.

Patent Literature 2 discloses that adhesion of carbon black to the surface of graphite, which is used as a conductive agent in the negative electrode, improves the load characteristics of non-aqueous electrolyte secondary batteries.

CITATION LIST

Patent Literature

PTL 1: International Publication No. WO 2006/019245
PTL 2: Japanese Published Unexamined Patent Application No. 2003-346804

SUMMARY OF INVENTION

Such non-aqueous electrolyte secondary batteries in the related art, however, may still have high resistance at room temperature.

The present disclosure is directed to a non-aqueous electrolyte secondary battery whose resistance at room temperature is lower than that in the related art.

According to the present disclosure, a non-aqueous electrolyte secondary battery includes a non-aqueous electrolyte and an electrode body in which a positive electrode plate and a negative electrode plate are layered with a separator interposed therebetween. The positive electrode plate contains a phosphate compound. The negative electrode plate contains a graphite-based material, an amorphous/non-crystalline carbon material, and a rubber-based binder. The ratio of the coverage of the rubber-based binder on the amorphous/non-crystalline carbon material to the coverage of the rubber-based binder on the graphite-based material is more than 0 and 0.5 or less.

According to the present disclosure, the resistance of the non-aqueous electrolyte secondary battery at room temperature is reduced to improve the input-output characteristics at room temperature.

DESCRIPTION OF EMBODIMENTS

It has been known that, during charging of non-aqueous electrolyte secondary batteries, part of decomposition products formed by decomposition of the non-aqueous electrolyte in the positive electrode react with a binder on the carbon material, which is a negative electrode active material, to form a coating film in the negative electrode. The inventors of the present disclosure have found that the resistance of a non-aqueous electrolyte secondary battery where the positive electrode contains a phosphate compound and the negative electrode contains an amorphous/non-crystalline carbon material is higher than that of a non-aqueous electrolyte secondary battery where the negative electrode is free of an amorphous/non-crystalline carbon material and composed only of a graphite-based material. The following facts may contribute to this phenomenon: when the positive electrode contains a phosphate compound, the catalysis of the phosphate compound changes the reaction potential and the reaction rate of the decomposition reaction of the non-aqueous electrolyte in the positive electrode during charging; and when the negative electrode contains an amorphous/non-crystalline carbon material, the binder on the amorphous/non-crystalline carbon material preferentially reacts with the decomposition products of the non-aqueous electrolyte to form a coating film because the reaction potential of the amorphous/non-crystalline carbon material is higher than that of the graphite-based material and, in particular, a rubber-based binder on the amorphous/non-crystalline carbon material and the decomposition products of the non-aqueous electrolyte form a coating film having high resistivity.

The inventors of the present disclosure have carried out diligent studies and have found that, when the ratio of the coverage of a rubber-based binder on an amorphous/non-crystalline carbon material to the coverage of a rubber-based binder on a graphite material in the negative electrode is reduced to 0.5 or less, and the positive electrode contains a phosphate compound, an increase in the resistance of the coating film formed in the negative electrode can be suppressed, reducing the resistance of a non-aqueous electrolyte secondary battery at room temperature and improving the input-output characteristics at room temperature.

Embodiments of the present disclosure will be described below in detail.

<Structure of Non-Aqueous Electrolyte Secondary Battery>

A non-aqueous electrolyte secondary battery in an embodiment has the same basic structure as that in the related art. The non-aqueous electrolyte secondary battery has a wound electrode body in which a positive electrode plate and a negative electrode plate are layered and wound with a separator interposed therebetween. The outermost surface of the wound electrode body is covered with the separator. The non-aqueous electrolyte secondary battery according to this embodiment is not limited to the above-described structure as long as the battery has a structure in which the positive electrode plate and the negative electrode plate are layered with the separator interposed therebetween.

A positive electrode plate (hereinafter also referred to simply as a "positive electrode") includes a positive electrode core and a positive electrode mixture layer formed on each surface of the positive electrode core. The positive electrode mixture layer is formed such that a positive electrode core-exposed portion in which the positive electrode core is exposed as a strip shape in the longitudinal direction is formed at least at one end portion of each surface of the positive electrode core in the width direction.

The negative electrode plate (hereinafter also referred to simply as a "negative electrode") includes a negative electrode core and a negative electrode mixture layer formed on each surface of the negative electrode core. The negative electrode mixture layer is formed such that a negative electrode core-exposed portion in which the negative electrode core is exposed as a strip shape in the longitudinal direction is formed at least at one end portion of each surface of the negative electrode core in the width direction.

The positive electrode plate and the negative electrode plate are wound with the separator interposed therebetween, and the wound product is formed into, for example, a flat shape to produce a flat wound electrode body. In this process, the wound positive electrode core-exposed portion is formed at one end portion of the flat wound electrode body, while the wound negative electrode core-exposed portion is formed at the other end portion.

The wound positive electrode core-exposed portion is electrically connected to a positive electrode terminal via a positive electrode current collector. The wound negative electrode core-exposed portion is electrically connected to a negative electrode terminal via a negative electrode current collector. The positive electrode terminal is fixed to a sealing body with an insulating member interposed therebetween, while the negative electrode terminal is also fixed to the sealing body with an insulating member interposed therebetween.

The flat wound electrode body is placed in a prismatic outer body while the flat wound electrode body is covered with an insulating sheet made of a resin. The sealing body is brought into contact with an opening of the prismatic outer body made of a metal, and the contact portion between the sealing body and the prismatic outer body is subjected to laser welding.

The sealing body has a non-aqueous electrolyte injection port. A non-aqueous electrolyte is injected through the non-aqueous electrolyte injection port, and the non-aqueous electrolyte injection port is then sealed with a blind rivet or the like. Of course, this non-aqueous electrolyte secondary battery is illustrative as an example, and a non-aqueous electrolyte secondary battery having another structure, for example, a laminate-type non-aqueous electrolyte secondary battery formed by inserting a non-aqueous electrolyte and a wound electrode body into a laminate outer body may be employed. The open shape of the outer body may be, for example, a cylindrical shape, a prismatic shape, or a coin type.

Next, the positive electrode plate, the negative electrode plate, the separator, and the non-aqueous electrolyte in the non-aqueous electrolyte secondary battery according to this embodiment will be described.

<Positive Electrode Plate>

The positive electrode core in the positive electrode plate may be, for example, a foil made of a metal stable in the potential range of the positive electrode or a film having the surface layer made of the metal. The metal used for the positive electrode core is preferably aluminum or an aluminum alloy. The positive electrode current collector and the positive electrode terminal are also preferably made of aluminum or an aluminum alloy.

The positive electrode mixture layer contains a positive electrode active material and a phosphate compound. The positive electrode mixture layer preferably further contains a conductive agent and a binder. The positive electrode plate can be produced by, for example, preparing a positive electrode mixture slurry containing a positive electrode active material, a binder, and the like, applying the positive electrode mixture slurry to the positive electrode core, and drying the coating films, followed by rolling to form a positive electrode mixture layer on each surface of the positive electrode core.

Examples of the positive electrode active material include metal oxides containing alkali metal elements. Examples of alkali metal elements include lithium (Li) and sodium (Na). Examples of metal elements other than alkali metal elements include transition metal elements, alkaline earth metal elements, and the group 12 to group 14 elements.

The positive electrode active material is preferably a lithium transition metal oxide. The lithium transition metal oxide is represented by, for example, general formula $Li_{1+x}M_aO_{2+b}$ (where $x+a=1$, $-0.2<x\leq0.2$, $-0.1\leq b\leq0.1$, and M includes at least one metal element selected from Ni, Co, and Mn). In the general formula, M preferably includes at least one transition metal element selected from nickel (Ni), cobalt (Co), and manganese (Mn).

Examples of elements other than Ni, Co, and Mn included in M in the general formula include transition metal elements, alkaline earth metal elements, and the group 12 to group 14 elements. Specific examples include zirconium (Zr), tungsten (W), boron (B), magnesium (Mg), aluminum (Al), titanium (Ti), chromium (Cr), iron (Fe), copper (Cu), zinc (Zn), niobium (Nb), molybdenum (Mo), tantalum (Ta), tin (Sn), sodium (Na), potassium (K), barium (Ba), strontium (Sr), and calcium (Ca). Zirconium (Zr) has, for example, a function of stabilizing the crystal structure of lithium transition metal oxides.

The positive electrode active material made of a lithium transition metal oxide exists, for example, as secondary particles (not broken down into primary particles by ultrasonic dispersion or the like) formed by aggregation of primary particles. The particle size of the positive electrode active material is not limited, but the volume average particle size of the secondary particles determined by laser diffraction analysis is preferably 0.1 µm or more and 20 µm or less. When the volume average particle size of the positive electrode active material is within this range, the positive electrode mixture layer has both good ionic conductivity and good electron conductivity. To, for example, retain and diffuse the electrolyte, the specific surface area of the positive electrode active material, such as a lithium transition metal oxide, determined by the BET method is preferably 0.1 $m^2$/g or more and 6 $m^2$/g or less.

In the non-aqueous electrolyte secondary battery according to this embodiment, the positive electrode mixture layer of the positive electrode plate contains a phosphate compound. The presence of the phosphate compound in the positive electrode plate can suppress the decomposition reaction of the non-aqueous electrolyte in the positive electrode at a high potential (mainly 4.3 V or higher (based on Li/Li+)) and can improve the safety at the time of overcharging. Examples of the phosphate compound in the positive electrode mixture layer include phosphates and phosphoric acid salts. The phosphate compound is, for example, at least one selected from the group consisting of lithium phosphate, lithium dihydrogen phosphate, cobalt phosphate, nickel phosphate, manganese phosphate, potassium phosphate, and ammonium dihydrogen phosphate. Among these, lithium phosphate is particularly preferably used.

The amount of the phosphate compound in the positive electrode mixture layer is preferably 0.01% by mass or more and 15% by mass or less, more preferably 0.05% by mass or more and 10% by mass or less, and still more preferably 0.1% by mass or more and 5% by mass or less relative to the total weight of the positive electrode active material. The particle size of the phosphate compound is preferably smaller than the particle size of the positive electrode active material, for example, 25% or less of the average particle size of the positive electrode active material.

An example method for causing the positive electrode mixture layer to contain the phosphate compound includes a method involving mechanically mixing the positive electrode active material and the phosphate compound so that the phosphate compound adheres to the surfaces of the positive electrode active material particles, and then mixing the positive electrode active material having the phosphate compound and a dispersion medium. An alternative method involves preparing a positive electrode mixture slurry containing the phosphate compound by adding the phosphate compound to a positive electrode mixture slurry in which a positive electrode active material is dispersed in a dispersion medium, and forming a positive electrode mixture layer. The former method is preferred because the phosphate compound can efficiently be located near the surface of the positive electrode active material.

The positive electrode mixture layer of the positive electrode plate in the non-aqueous electrolyte secondary battery according to this embodiment preferably contains a tungsten (W) compound. The tungsten compound is a compound containing a tungsten element and includes a tungsten simple substance. Examples of the tungsten compound include tungsten oxides such as $WO_3$ and $W_2O_5$. The tungsten compound is preferably $WO_3$ in which the oxidation state of tungsten is 6, which is most stable. The presence of the tungsten compound in the positive electrode can suppress the decomposition reaction of the non-aqueous electrolyte in the positive electrode and can suppress formation of the surface coating film of the negative electrode.

The tungsten compound to be contained in the positive electrode mixture layer may be contained in the positive electrode active material or may be mixed with the positive electrode active material in the process of forming a positive electrode mixture layer so that the positive electrode mixture layer contains the tungsten compound. The amount of the tungsten compound in the positive electrode is preferably 0.01% by mass or more and 5% by mass or less, more preferably 0.05% by mass or more and 4% by mass or less, and still more preferably 0.1% by mass or more and 3% by mass or less relative to the total weight of the positive electrode active material.

The positive electrode active material containing the tungsten compound is, for example, a lithium transition metal oxide represented by the general formula $Li_{1+x}M_aO_{2+b}$ where M contains tungsten. The lithium transition metal oxide containing tungsten can be synthesized by, for example, mixing a composite oxide containing Ni, Co, Mn, or the like, a lithium compound, such as lithium hydroxide, and a tungsten compound, such as tungsten oxide, and firing the resulting mixture. In accordance with the method described above, a positive electrode active material in which a lithium transition metal oxide and tungsten are dissolved can be produced. Some of tungsten atoms may deposit in a state of oxide or metal at the interfaces of the primary particles or on the surfaces of the secondary particles of the positive electrode active material.

The amount of tungsten when the lithium transition metal oxide contains tungsten is preferably 0.05 mol % or more and 10 mol % or less, more preferably 0.1 mol % or more and 5 mol % or less, and still more preferably 0.2 mol % or more and 3 mol % or less relative to the metal elements except for Li in the lithium transition metal oxide.

An example method of mixing a positive electrode active material and a tungsten compound so that the positive electrode mixture layer contains the tungsten compound include a method involving, like a phosphate compound, mechanically mixing the positive electrode active material and a phosphate compound so that the tungsten compound adheres to the surfaces of positive electrode active material particles, and then mixing the positive electrode active material having the tungsten compound and a dispersion medium. An alternative method involves preparing a positive electrode mixture slurry containing a tungsten compound by adding the tungsten compound to a positive electrode mixture slurry containing at least a positive electrode active material and a dispersion medium, and forming a positive electrode mixture layer. The former method is preferred because the tungsten compound can efficiently be located near the surface of the positive electrode active material. The particle size of the particles of the tungsten compound is preferably smaller than the particle size of the positive electrode active material and is, for example, 25% or less of the volume average particle size of the positive electrode active material.

The conductive agent is used to increase the electrical conductivity of the positive electrode mixture layer. Examples of the conductive agent include carbon materials, such as carbon black, acetylene black, Ketjenblack, and graphite. These conductive agents may be used alone or in combination of two or more.

The binder is used to maintain good conditions of contact between the positive electrode active material and the conductive agent and to increase the strength of binding of the positive electrode active material and the like to the surface of the positive electrode current collector. Examples of the binder include fluorine-containing resins, such as polytetrafluoroethylene (PTFE) and polyvinylidene fluoride (PVdF), polyacrylonitrile (PAN), polyimide-based resins, acrylic resins, and polyolefin-based resins. These resins may be used together with carboxymethyl cellulose (CMC) or a salt thereof (may be, for example, CMC-Na, CMC-K, CMC-$NH_4$, or a partially neutralized salt), or polyethylene oxide (PEO). These binders may be used alone or in combination of two or more.

<Negative Electrode Plate>

The negative electrode core in the negative electrode plate may be, for example, a foil made of a metal stable in the potential range of the negative electrode or a film having the surface layer made of the metal. The metal used for the negative electrode core is preferably copper or a copper alloy. The negative electrode current collector and the negative electrode terminal are also preferably made of copper or a copper alloy.

According to this embodiment, the negative electrode plate contains at least a graphite-based material, an amorphous/non-crystalline carbon material, and a rubber-based binder. The graphite-based material and the amorphous/non-crystalline carbon material serve as negative electrode active materials that reversibly intercalate and deintercalate lithium ions. The negative electrode plate can be produced by, for example, preparing a negative electrode mixture slurry containing a negative electrode active material, a rubber-based binder, and the like, applying the negative electrode mixture slurry to the negative electrode core, and drying the coating films, followed by rolling to form a negative electrode mixture layer on each surface of the negative electrode core.

In the non-aqueous electrolyte secondary battery according to this embodiment, the negative electrode plate is configured such that the ratio of the coverage of the rubber-based binder on the amorphous/non-crystalline carbon material to the coverage of the rubber-based binder on the graphite-based material (hereinafter also referred to as a "binder coverage ratio") is more than 0 and 0.5 or less. The coverage of the rubber-based binder on the amorphous/non-crystalline carbon material refers to the percentage of the area of the surface of the amorphous/non-crystalline carbon material coated with the rubber-based binder relative to the total surface area of the amorphous/non-crystalline carbon material. Similarly, the coverage of the rubber-based binder on the graphite-based material refers to the percentage of the area of the surface of the graphite-based material coated with the rubber-based binder relative to the total surface area of the graphite-based material.

The coverage of the rubber-based binder on the amorphous/non-crystalline carbon material and the coverage of the rubber-based binder on the graphite-based material can be determined as follows: for example, dyeing the negative electrode mixture layer of the negative electrode plate with a stain, such as bromine, and then observing the surface of the negative electrode plate on the negative electrode mixture layer side by scanning electron microscopy/energy-dispersive X-ray spectroscopy (SEM/EDX) to measure the surface area of the amorphous/non-crystalline carbon material, the area of the amorphous/non-crystalline carbon material coated with the rubber-based binder, the surface area of the graphite-based material, and the area of the graphite-based material coated with the rubber-based binder.

The amorphous/non-crystalline carbon material effectively intercalates Li ions and can reduce the resistance of non-aqueous electrolyte secondary batteries when contained in the negative electrode mixture layer. As described above, however, when the positive electrode contains a phosphate compound, the rubber-based binder and the decomposition products of the non-aqueous electrolyte form a high-resistance coating film on the amorphous/non-crystalline carbon material having a reaction potential higher than that of the graphite-based material. The formation of the high-resistance coating film increases the resistance of non-aqueous electrolyte secondary batteries although the amorphous/non-crystalline carbon material is used. In the non-aqueous electrolyte secondary battery according to this embodiment, the binder coverage ratio in the negative electrode is reduced to 0.5 or less, which is lower than that in the related art. With such a binder coverage ratio, an increase in the resistance of the non-aqueous electrolyte secondary battery due to the formation of a high-resistance coating film can be suppressed even when the positive electrode contains a phosphate compound and the negative electrode contains an amorphous/non-crystalline carbon material and a rubber-based binder. There is also advantageous in that the presence of a phosphate compound in the positive electrode mixture layer can increase the safety at the time of overcharging.

In the non-aqueous electrolyte secondary battery according to this embodiment, the binder coverage ratio in the negative electrode plate is preferably 0.3 or less. When the binder coverage ratio is 0.3 or less, the resistance of the non-aqueous electrolyte secondary battery at room temperature even in the case where the positive electrode contains a phosphate compound and the negative electrode contains an amorphous/non-crystalline carbon material and a rubber-based binder is reduced to improve the input-output characteristics at room temperature compared to the case where the negative electrode active material is free of an amorphous/non-crystalline carbon material and composed only of a graphite-based material. The binder coverage ratio in the negative electrode plate is preferably 0.1 or more from the viewpoints of the adhesion between the negative electrode active material particles and the adhesion between the negative electrode active material and the negative electrode core.

The "graphite-based material" contained in the negative electrode plate refers to a carbon material in which the graphite crystal structure has developed. Examples of the graphite-based material include natural graphite and synthetic graphite. These graphite-based materials may have a scale shape or may be subjected to spheronization where the materials are processed into a spherical shape. Synthetic graphite is produced by heating raw materials, such as petroleum, coal pitch, and coke, at a temperature from 2000° C. to 3000° C. or a higher temperature in, for example, an Acheson furnace or a graphite heater furnace. The interplanar spacing d(002) of the graphite-based material determined by X-ray diffraction is 0.340 nm or less and preferably 0.336 nm or less. The thickness (Lc(002)) of the crystal of the graphite-based material in the c-axis direction is preferably 30 to 1000 nm.

The "amorphous/non-crystalline carbon material" contained in the negative electrode plate refers to a carbon material that has a turbostratic structure in an amorphous or fine crystal form in which the graphite crystal structure does not develop, or refers to a carbon material having a very small particle size rather than having a spherical shape or scale shape. For example, a carbon material in which the interplanar spacing d(002) determined by X-ray diffraction is more than 0.340 nm is an amorphous/non-crystalline carbon material. In addition, a carbon material in which the average particle size of primary particles determined by observation through, for example, a scanning electron microscope (SEM) is 1 μm or less is also an amorphous/non-crystalline carbon material. Specific examples of the amorphous/non-crystalline carbon material include hard carbon (non-graphitizable carbon), soft carbon (graphitizable carbon), carbon black, carbon fiber, and activated carbon.

The method for producing the amorphous/non-crystalline carbon material is not limited. For example, the amorphous/non-crystalline carbon material is produced by carbonizing a resin or a resin composition. The resin or the resin composition may be, for example, a phenol-based thermosetting resin, a thermoplastic resin, such as polyacrylonitrile, and a petroleum-derived or coal-derived tar or pitch. Carbon black is produced by thermally decomposing a hydrocarbon, which is a raw material, by a thermal decomposition method, an incomplete combustion method, or other methods. Examples of the thermal decomposition method include a thermal method and an acetylene decomposition method. Examples of the incomplete combustion method include a contact method, a lamp-burnt pine method, a gas furnace method, and an oil furnace method. Specific examples of carbon black produced by these production methods include acetylene black, Ketjenblack, thermal black, and furnace black. The surface of such an amorphous/non-crystalline carbon material may further be coated with another non-crystalline or amorphous carbon.

The specific surface area of the amorphous/non-crystalline carbon material is preferably 5 $m^2/g$ or more and 200 $m^2/g$ or less. This is because, when the specific surface area is 5 $m^2/g$ or more, the reaction surface area for the Li intercalation reaction is large. If the specific surface area is more than 200 $m^2/g$, an excessive reaction may occur on the surface and the resistance may increase.

The primary particle size of the amorphous/non-crystalline carbon material is preferably 20 nm or more and 1000 nm or less and more preferably 40 nm or more and 100 nm or less from the viewpoint of the diffusion distance of lithium and to reduce an excessive specific surface area. The primary particles of the amorphous/non-crystalline carbon material preferably have no hollow structure in which the particles have an empty space inside.

Although the mixing ratio of the graphite-based material and the amorphous/non-crystalline carbon material is not limited, the amount of the amorphous/non-crystalline carbon material is preferably 1% by mass or more relative to the total amount of the negative electrode active material in order to reduce the resistance of the non-aqueous electrolyte secondary battery. If the amorphous/non-crystalline carbon material is present in an excessive amount, the long-term battery life characteristics at high temperature (capacity retention characteristics determined by charge/discharge cycle testing) may be degraded. The upper limit of the amount of the amorphous/non-crystalline carbon material is preferably set in view of this point. For example, the amount of the amorphous/non-crystalline carbon material is preferably 15% by mass or less relative to the total amount of the negative electrode active material.

The "rubber-based binder" contained in the negative electrode plate according to this embodiment refers to a binder containing a polymer compound having elasticity. Examples of the rubber-based binder include, but are not limited to, rubber binders, such as styrene-butadiene rubber (SBR), high-styrene rubber, ethylene propylene rubber, butyl rubber, polychloroprene rubber, butadiene rubber, isoprene rubber, acrylonitrile-butadiene rubber, acrylonitrile rubber, fluorocarbon rubber, acrylic rubber (ACM), and silicone rubber. These rubber binders may be used alone or as a mixture of two or more. In particular, rubber-based binders having unsaturated carbon bonds, such as SBR, are highly reactive with the decomposition products of the electrolyte solution. When such a rubber-based binder is present on the amorphous/non-crystalline carbon, a coating film to be formed tends to have high resistance.

In the negative electrode plate, the negative electrode mixture layer may contain a binder (hereinafter also referred to as a "non-rubber binder") other than the rubber-based binder. Examples of the non-rubber binder include fluorine-containing resins, PAN, polyimide-based resins, acrylic resins, polyolefin-based resins, carboxymethyl cellulose (CMC) or a salt thereof (may be, for example, CMC-Na, CMC-K, CMC-$NH_4$, or a partially neutralized salt), polyethylene oxide (PEO), polyacrylic acid (PAA) or a salt (may be, for example, PAA-Na, PAA-K, or a partially neutralized salt), and polyvinyl alcohol (PVA).

A method for controlling the binder coverage ratio in the negative electrode plate is not limited as long as the above-described binder coverage ratio is obtained. For example, the conditions in which the rubber-based binder adheres to the amorphous/non-crystalline carbon material and the graphite-based material can be controlled by a method for preparing the negative electrode mixture slurry. More specifically, the coverage with the rubber-based binder may be controlled by applying the non-rubber binder to the amorphous/non-crystalline carbon material before coating the amorphous/non-crystalline carbon material with the rubber-based binder.

The non-rubber binder used for preparing the negative electrode mixture slurry may be, for example, the above-described non-rubber binder. In particular, a water-soluble or hydrophilic non-rubber binder is preferred. Examples of the water-soluble or hydrophilic non-rubber binder include chemically modified celluloses, such as CMC or a salt thereof, PEO, PAA or a salt thereof, and PVA.

A method for preparing the negative electrode mixture slurry using a non-rubber binder involves first mixing an amorphous/non-crystalline carbon material and a non-rubber binder, such as CMC, so that the amorphous/non-crystalline carbon material is coated with a non-rubber binder, such as CNC. Since a larger amount of hydrophilic functional groups is present on the surface of the amorphous/non-crystalline carbon material than that on the graphite-based material, the interaction between the hydrophilic functional groups and the non-rubber binder, such as CMC, relatively suppresses the adhesion of the rubber-based binder, which is added to the slurry later, onto the amorphous/non-crystalline carbon material. The non-rubber binder used in the method for preparing the negative electrode mixture slurry is preferably CMC or a salt thereof.

In general, a negative electrode mixture slurry is prepared by placing a graphite-based material and an amorphous/non-crystalline carbon material, and binders in a dispersion medium (e.g., water), and mixing these. In a preparation method known in the art, a negative electrode mixture slurry is prepared by mixing a graphite-based material, an amorphous/non-crystalline carbon material, and binders together. When a graphite-based material, an amorphous/non-crystalline carbon material, and binders are mixed together in this way, however, both the rubber-based binder and the non-rubber binder randomly collide with the graphite-based material and the amorphous/non-crystalline carbon material and randomly adhere to the carbon of the graphite-based material and the carbon of the amorphous/non-crystalline carbon material.

Unlike the method for preparing a negative electrode mixture slurry known in the art, components other than a non-rubber binder are premixed with an amorphous/non-crystalline carbon material so that the amorphous/non-crystalline carbon material is coated with the non-rubber binder. Then, the amorphous/non-crystalline carbon material coated with the non-rubber binder, and a graphite-based material and a rubber-based binder are mixed to prepare a slurry. This process causes the rubber-based binder to preferentially adhere to the graphite-based material and enables production of the negative electrode plate according to this embodiment in which the coverage of the rubber-based binder on the amorphous/non-crystalline carbon material is lower than the coverage of the rubber-based binder on the graphite-based material.

In particular, in premixing the non-rubber binder and the amorphous/non-crystalline carbon material, the shear (strength) at mixing is desirably high, and the ratio of the non-rubber binder to the amorphous/non-crystalline carbon material is desirably high. This is because the amount of the non-rubber binder that adheres to the surface of the amorphous/non-crystalline carbon material can be increased increasing the frequency of collision between the non-rubber binder and the amorphous/non-crystalline carbon material. In adding the rubber-based binder to the amorphous/non-crystalline carbon material coated with the non-rubber binder, the shear (strength) at mixing is desirably law. Examples of the technique for increasing the shear at mixing include, but are not limited to, increasing the solids contents by reducing the amount of the dispersion medium; and mixing with a device that can apply a high shear rate, such as a high-pressure homogenizer or a thin-film spin system high-speed mixer (e.g., FILMIX available from PRIMIX Corporation).

Since an amorphous/non-crystalline carbon material and CMC, which is a non-rubber binder, both have a strong affinity for each other and tends to adhere to each other, and an amorphous/non-crystalline carbon material generally has a high specific surface area, the amorphous/non-crystalline carbon material can be mixed with the non-rubber binder at a solids content higher than that in the related art. The coverage of the rubber-based binder on the amorphous/non-crystalline carbon material can be reduced by increasing the shear at mixing and accelerating adhesion. The solids content refers to the proportion (mass %) of the total amount of components other than a dispersion medium, such as water, relative to the total amount of the negative electrode mixture slurry. The proportion of the non-rubber binder relative to the amorphous/non-crystalline carbon material is preferably, for example, 10% by mass or more.

The coverage of the rubber-based binder on the amorphous/non-crystalline carbon material and the graphite-based material can also be controlled by the crystallinity of the amorphous/non-crystalline carbon material. Since the area of the crystal interface exposed to the surface is small in an amorphous/non-crystalline carbon material having higher crystallinity, the surface energy is low and the water wettability of the surface is high. The interaction between the amorphous/non-crystalline carbon material and CMC thus becomes large, and CMC more preferentially adheres to the surface of the amorphous/non-crystalline carbon material than the rubber-based binder. As a result, the coverage of the rubber-based binder on the amorphous/non-crystalline carbon material can be relatively reduced.

The amorphous/non-crystalline carbon material is preferably uniformly dispersed in the negative electrode mixture layer because this uniform dispersion leads to a relaxed current density distribution of the entire negative electrode plate and a low resistance. The expression "uniformly dispersed" as used herein means that the amorphous/non-crystalline carbon material is not concentrated at a certain place when an arbitrary part of the negative electrode is observed through, for example, SEM. When primary particles concentrated at a particular place are defined as an aggregate, the size of the aggregate relative to the primary particles is not too large, and the ratio of the primary particle size of the amorphous/non-crystalline carbon material to the secondary particle size of the aggregate is preferably 1:1 to 100, and more preferably 1:1 to 50. When the primary particle size of the amorphous/non-crystalline carbon material is about 20 to 50 nm, the secondary particle size is preferably 1 μm or less.

A known surfactant compound may be added to the negative electrode mixture slurry as desired. The surfactant is electrically and chemically adsorbed onto the surface of the carbon material to improve dispersion stability. Examples of the surfactant include sulfonate-type anionic surfactants, such as alkyl benzene sulfonate, and nonionic surfactants, such as polyoxyethylene alkyl phenyl ether. Since these surfactants may function as a component resistant to electron conductivity, the surfactant preferably has a low boiling point and a low sublimation point and can preferably be volatilized by drying or the like.

<Separator>

An insulating porous sheet having ion permeability is used as a separator. Specific examples of the porous sheet include a microporous thin film, a woven fabric, and a non-woven fabric. Examples of suitable materials of the separator include olefin-based resins, such as polyethylene and polypropylene, and cellulose. The separator may be a layered product having a cellulose fiber layer and a thermoplastic resin fiber layer made of olefin-based resin or the like.

<Non-Aqueous Electrolyte>

The electrolyte is, for example, a non-aqueous electrolyte containing a non-aqueous solvent and an electrolyte salt dissolved in the non-aqueous solvent. The non-aqueous electrolyte is not be limited to a liquid electrolyte (non-aqueous electrolyte solution) and may be a solid electrolyte formed by using a gel polymer or the like. Examples of the non-aqueous solvent include esters, ethers, nitriles, amides, such as dimethylformamide, and solvent mixtures of these two or more. In addition, sulfone group-containing compounds, such as propanesultone, may be used. The non-aqueous solvent may contain a halogenated product formed by substituting at least part of hydrogen atoms of such a solvent with halogen atoms, such as a fluorine atom.

Examples of the esters include cyclic carbonates, chain carbonates, and carboxylic acid esters. Examples of the cyclic carbonates include ethylene carbonate (EC), propylene carbonate (PC), butylene carbonate, and vinylene carbonate. Examples of the chain carbonates include dimethyl carbonate (DMC), methyl ethyl carbonate (EMC), diethyl carbonate (DEC), methyl propyl carbonate, ethyl propyl carbonate, and methyl isopropyl carbonate.

Examples of the carboxylic acid esters include chain carboxylic acid esters, such as methyl propionate, ethyl propionate, methyl acetate, ethyl acetate, and propyl acetate; and cyclic carboxylic acid esters, such as γ-butyrolactone (GBL) and γ-valerolactone (GVL).

Examples of the ethers include cyclic ethers, such as 1,3-dioxolane, 4-methyl-1,3-dioxolane, tetrahydrofuran, 2-methyltetrahydrofuran, propylene oxide, 1,2-butyleneoxide, 1,3-dioxane, 1,4-dioxane, 1,3,5-trioxane, furan, 2-methylfuran, 1,8-cineole, and crown ether; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Examples of the nitriles include acetonitrile, propionitrile, butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile.

Examples of the halogenated product include fluorinated cyclic carbonates, such as fluoroethylene carbonate (FEC); fluorinated chain carbonates; and fluorinated chain carboxylates, such as methyl 3,3,3-trifluoropropionate (FMP).

The electrolyte salt used for the non-aqueous electrolyte is preferably a lithium salt. Examples of the lithium salt include borates, such as $LiBF_4$, $LiClO_4$, $LiAsF_6$, $LiSbF_6$, $LiAlCl_4$, $LiSCN$, $LiCF_3SO_3$, $LiC(C_2F_5SO_2)$ $LiCF_3CO2$, $Li(P(C_2O_4)F_4)$, $Li(P(C_2O_4)F_2)$, $LiPF_{6-x}(CnF_{2n+1})_x$ ($1<x<6$, n is 1 or 2), $LiB_{10}Cl_{10}$, LiCl, LiBr, LiI, chloroborane lithium, lower-aliphatic lithium carboxylates, $Li_2B_4O_7$, $Li(B(C_2O_4)_2)$ [(lithium bis(oxalato)borate (LiBOB)], and $Li(B(C_2O_4)F_2)$; imide salts, such as $LiN(FSO_2)_2$, $LiN(C_1F_{21+1}SO_2)$ $(C_mF_{2m+1}SO_2)$ {1 and m are integers of 1 or more}. These lithium salts may be used alone or as a mixture of two or more. Among these lithium salts, at least fluorine-containing lithium salts are preferably used and, for example, $LiPF_6$ is preferably used from the viewpoints of ionic conductivity, electrochemical stability, and the like. In particular, to form a stable coating film on the surface of the negative electrode even in a high-temperature environment, a fluorine-containing lithium salt and a lithium salt having an oxalate complex as an anion (e.g., LiBOB) are preferably used together. The concentration of a lithium salt is preferably 0.8 to 1.8 mol per litter of the non-aqueous solvent. In particular, to output higher power, the concentration of a lithium salt is more preferably 1.2 to 1.5 mol.

The positive electrode mixture layer preferably contains tungsten or a tungsten compound. Some of tungsten atoms contained in the positive electrode mixture layer dissolve during charging of the battery, migrate to the negative electrode, and deposit on the surface of the negative electrode. The dissolution and deposition cause the tungsten compound to finely and uniformly deposit on the surface of the negative electrode surface active material. Since the amorphous/non-crystalline carbon material in the negative electrode has a reaction potential higher than that of the graphite-based material, a surface coating film is preferentially formed in a region where the amorphous/non-crystalline carbon material is present. The formation of the surface coating film containing the tungsten compound on the amorphous/non-crystalline carbon material in the negative electrode can reduce the reaction overpotential of the Li intercalation reaction during charging.

When the positive electrode containing a tungsten compound in the positive electrode mixture layer further contains a phosphate compound, the catalysis of the phosphate compound changes the rate of the decomposition reaction of the tungsten compound in the positive electrode. The presence of the phosphate compound and the tungsten compound in the positive electrode can cause a surface coating film containing tungsten to form on the negative electrode active material when the electrolyte solution and Li ions are decomposed to form the surface coating film in the negative electrode. Since the surface coating film containing the tungsten compound formed on the amorphous/non-crystalline carbon material has a low reaction overpotential, the amorphous/non-crystalline carbon material successfully undergoes the Li intercalation reaction and contributes to higher output power.

The surface coating film of the negative electrode can also be formed effectively by leaving the battery to stand at high temperature for a certain period of time after charging to a certain level during the initial charging. More specifically, the battery is preferably charged to 40% to 80% of the rated capacity of the battery described below and preferably left to stand at temperatures from 45° C. to 80° C. for 10 to 30 hours.

EXAMPLES

Although the present disclosure will be described below in more detail by way of Examples and Comparative Examples, the present disclosure is not limited to the following Examples.

Experimental Example 1

[Production of Positive Electrode Active Material]

A nickel-cobalt-manganese composite oxide was produced by mixing $NiSO_4$, $CoSO_4$, and $MnSO_4$ in an aqueous solution to cause coprecipitation and firing a nickel-cobalt-manganese composite hydroxide formed by coprecipitation. Next, the composite oxide, lithium hydroxide, and tungsten oxide ($WO_3$) were mixed using an ishikawa grinding mixer such that the molar ratio of lithium, total transition metals (nickel, cobalt, and manganese), and tungsten is 1.2:1:0.005. This mixture was fired in the air and ground to produce a positive electrode active material formed of a lithium transition metal oxide containing W. The elemental analysis of the produced positive electrode active material by ICP spectrometry shows that the molar ratio of each element to the total transition metals in the lithium transition metal oxide was Ni:Co:mn:W=47:27:26:0.58.

[Production of Positive Electrode]

The positive electrode active material, $WO_3$, and $Li_3PO_4$ were mixed such that the amounts of $WO_3$ and $Li_3PO_4$ were 0.5% and 1% by mass relative to the positive electrode active material, respectively. This mixture, carbon black, and polyvinylidene fluoride (PVDF) were mixed at a mass ratio of 91:7:2. To this mixture was added N-methyl-2-pyrrolidone (NMP) serving as a dispersion medium. The dispersion was kneaded to prepare a positive electrode mixture slurry. Next, a positive electrode mixture slurry was applied to an aluminum foil serving as a positive electrode core, and coating films were dried to form positive electrode mixture layers on the aluminum foil. The core having the mixture layers was cut in a predetermined size and rolled. An aluminum tab was attached to produce a positive electrode.

[Production of Negative Electrode]

Seven parts by mass of acetylene black (AB), which was an amorphous/non-crystalline carbon material, and 0.7 parts by mass of carboxymethyl cellulose (CMC), which was a non-rubber binder, were mixed in a powder state to produce a powder mixture in which the weight ratio of CMC to AB was 10% by mass. To the powder mixture was added water in such an amount that the solids content was 25% by mass. The resulting mixture was mixed using a homogenizer ("Homogenizing Disper" available from PRIMIX Corporation) at a peripheral speed of 1.2 m/s. As a result of observation through SEM, the average particle size of primary particles of acetylene black (AB) used in Experimental Example 1 was 100 nm, and the interplanar spacing d(002) of AB determined by X-ray diffraction was 0.337 nm. To the mixture were added 93 parts by mass of graphite powder and water in such an amount that the solids content was 50% by mass. The resulting mixture was mixed using Homogenizing Disper at a peripheral speed of 1.5 m/s. Subsequently, 0.4 parts by mass of styrene-butadiene rubber (SBR) was added as a rubber-based binder and mixed using Homogenizing Disper similarly to prepare a negative electrode mixture slurry. Next, a negative electrode mixture slurry was applied to a negative electrode core made of copper foil and dried to form negative electrode mixture layers. The core having the negative electrode mixture layers was cut in a predetermined size and Tolled. A nickel tab was attached to produce a negative electrode (negative electrode production method A). The binder coverage ratio of the negative electrode produced by the negative electrode production method A was 0.30.

[Preparation of Non-Aqueous Electrolyte Solution]

Ethylene carbonate (EC), ethyl methyl carbonate (EMC), and dimethyl carbonate (DMC) were mixed in a volume ratio of 3:3:4. In the solvent mixture, 1.2 mol/L of $LiPF_6$ was dissolved to prepare a non-aqueous electrolyte solution.

[Production of Test Cell]

To produce a wound electrode body, one positive electrode, one negative electrode, and one separator formed of a polyethylene macroporous membrane were used. First, the positive electrode and the negative electrode were layered to oppose each other with the separator therebetween while these positive and negative electrodes are insulated by the separator. Next, the layered product was spirally wound using a cylindrical winding core. In this process, a positive-electrode current-collecting tab and a negative-electrode current-collecting tab are located on the outermost surface side in the respective electrodes. Subsequently, the winding core was removed to produce a wound electrode body.

The non-aqueous electrolyte solution and the wound electrode body thus produced were inserted into a laminate outer body made of aluminum in a glovebox containing an argon atmosphere to produce a laminate-type non-aqueous electrolyte secondary battery (test cell A1).

Experimental Example 2

A laminate-type non-aqueous electrolyte secondary battery (test cell B1) was produced in the same manner as that in Experimental Example 1 except that a negative electrode was produced by mixing together graphite powder, acetylene black (AB), which was an amorphous/non-crystalline carbon material, CMC, SBR, and water and then mixing the resulting mixture using "Homogenizing Disper" available from PRIMIX Corporation at a peripheral speed of 1.2 m/s to prepare a negative electrode mixture slurry in which the solids content was 60% by mass (negative electrode production method B). The binder coverage ratio of the negative electrode produced by the negative electrode production method B was 0.79.

Experimental Example 3

A laminate-type non-aqueous electrolyte secondary battery (test cell B2) was produced in the same manner as that in Experimental Example 1 except that acetylene black (AB), which was an amorphous/non-crystalline carbon material, was not mixed in production of a negative electrode.

Experimental Example 4

A laminate-type non-aqueous electrolyte secondary battery (test cell B3) was produced in the same manner as that in Experimental Example 1 except that $Li_3PO_4$ was not mixed in production of a positive electrode.

Experimental Example 5

A laminate-type non-aqueous electrolyte secondary battery (test cell B4) was produced in the same manner as that in Experimental Example 2 except that $Li_3PO_4$ was not mixed in production of a positive electrode.

Experimental Example 6

A laminate-type non-aqueous electrolyte secondary battery (test cell B5) was produced in the same manner as that in Experimental Example 3 except that $Li_3PO_4$ was not mixed in production of a positive electrode.

[Measurement of Coverage of Rubber-Based Binder on Carbon Material]

The negative electrode mixture layer was dyed by exposing the negative electrode used for preparing each test cell to bromine. The surface of the negative electrode mixture layer was then observed through SEM/EDX. The coverage of the rubber-based binder on the amorphous/non-crystalline carbon material was determined by measuring the area of the surface of the amorphous/non-crystalline carbon material coated with the rubber-based binder and the surface area of the amorphous/non-crystalline carbon material through observation of an arbitrary region (125 μm×75 μm) of the surface of the negative electrode mixture layer. The coverage of the rubber-based binder on the graphite-based material was determined similarly. The binder coverage ratio of each test cell was calculated by dividing the coverage of the rubber-based binder on the amorphous/non-crystalline carbon material by the coverage of the rubber-based binder on the graphite-based material.

[Output-Characteristics Test]

The test cells A1 and B1 to B5 were charged to 60% of the rated capacity at a current density of 0.2 I·t (C rate) at a temperature of 25° C. and then left to stand at 75° C. for 22 hours. Subsequently, the test cells were charged at a constant current until the voltage reached 4.1 V and then charged at a constant voltage of 4.1 V until the current density reached 0.05 I·t (C rate). The discharge capacity when constant-current discharging was performed at a current density of 0.2 I·t (C rate) at a temperature of 25° C. until the voltage reached 2.5 V was defined as the rated capacity of each test cell.

Next, the cells were charged to half of the rated capacity at a current density of 0.2 I·t. Subsequently, the cells were charged at a constant current density for 10 seconds, and the voltage at the time when the 10-second charging was completed was measured. The voltage was measured at various current densities in the range from 0.2 to 1.5 I·t, and the measured voltage was plotted as a function of current density to obtain the slope of the straight line of voltage versus current. The slope was taken as the resistance.

The results of the output-characteristics test for the test cells A1, B1, and B2 produced in Experimental Examples 1 to 3 are shown in Table 1. The results of the output-characteristics test for the test cells B3 to B5 produced in Experimental Examples 4 to 6 are shown in Table 2. Table 1 shows differences in resistance from the resistance of the test cell B2. Table 2 shows differences in resistance from the resistance of the test cell B5.

TABLE 1

| | Test Cell No. | Positive Electrode phosphate compound | Negative Electrode amorphous/non-crystalline carbon material | Negative Electrode production method | Negative Electrode binder coverage ratio | Battery Characteristics difference in resistance mΩ |
|---|---|---|---|---|---|---|
| Experimental Example 1 | A1 | present | acetylene black | A | 0.30 | −30 |
| Experimental Example 2 | B1 | present | acetylene black | B | 0.79 | +28 |
| Experimental Example 3 | B2 | present | absent | A | — | (reference) |

TABLE 2

| | Test Cell No. | Positive Electrode phosphate compound | Negative Electrode amorphous/non-crystalline carbon material | production method | binder coverage ratio | Battery Characteristics difference in resistance mΩ |
|---|---|---|---|---|---|---|
| Experimental Example 4 | B3 | absent | acetylene black | A | 0.30 | −2 |
| Experimental Example 5 | B4 | absent | acetylene black | B | 0.79 | −1 |
| Experimental Example 6 | B5 | absent | absent | A | — | (reference) |

As shown in Table 1, the resistance in Experimental Example 2 is higher than that in Experimental Example 3. This may be because the positive electrode contains $Li_3PO_4$ and the negative electrode contains the amorphous/non-crystalline carbon material as a negative electrode active material. The decomposition products of the non-aqueous electrolyte and the rubber-based binder that covers the amorphous/non-crystalline carbon material form a coating film having high resistance, increasing the resistance of the battery. As shown in Experimental Examples 4 to 6 in Table 2, such a phenomenon does not occur in the cases where the positive electrode is free of $Li_3PO_4$, and preferential formation of a coating film having high resistance on the amorphous/non-crystalline carbon material is promoted only in the cases where the positive electrode contains $Li_3PO_4$.

In the test cell A1 in Experimental Example 1 (the positive electrode contains $Li_3PO_4$, and a negative electrode mixture slurry containing AB and CMC and having a solids content lower than that in the related art is used for the negative electrode), the positive electrode contains $Li_3PO_4$, and the negative electrode contains the amorphous/non-crystalline carbon material. However, the test cell A1 in Experimental Example 1 achieves a significant reduction in resistance at room temperature compared to the test cell B1 of Experimental Example 2 and test cell B2 of Experimental Example 3. This may be because the formation of a coating film by the decomposition products of the non-aqueous electrolyte and the rubber-based binder on the amorphous/non-crystalline carbon material can be suppressed by reducing the binder coverage ratio, that is, the ratio of the coverage of the rubber-based binder on the amorphous/non-crystalline carbon material to the coverage of the rubber-based binder on the graphite-based material.

Experimental Example 7

A laminate-type non-aqueous electrolyte secondary battery (test cell B6) was produced in the same manner as that in Experimental Example 1 except that a negative electrode was produced by preparing a negative electrode mixture slurry using, instead of acetylene black, a carbon material (addition species β) whose interplanar spacing d(002) determined by X-ray diffraction was 0.356 nm. The result of the output-characteristics test for the test cell B6 is shown in Table 3 together with the results of Experimental Example 1 and Experimental Example 3.

TABLE 3

| | Test Cell No. | Positive Electrode phosphate compound | Negative Electrode carbon material | production method | binder coverage ratio | Battery Characteristics difference in resistance mΩ |
|---|---|---|---|---|---|---|
| Experimental Example 1 | A1 | present | acetylene black | A | 0.30 | −30 |
| Experimental Example 7 | B6 | present | addition species β | A | 0.87 | +34 |
| Experimental Example 3 | B2 | present | absent | A | — | (reference) |

As shown in Table 3, in the non-aqueous electrolyte secondary battery produced by using, instead of the amorphous/non-crystalline carbon material, a carbon material whose interplanar spacing d(002) determined by X-ray diffraction is more than 0.350 nm in the method for preparing a negative electrode mixture slurry, the binder coverage ratio is more than 0.50, and the resistance of the non-aqueous electrolyte secondary battery at room temperature cannot be reduced. This may be because the added carbon material has low crystallinity and thus increases the surface energy, resulting in a limited coating effect of the non-rubber binder, such as CMC.

Experimental Example 8

First, 7 parts by mass of acetylene black (AB) (average particle size of primary particles determined by SEM: 100 nm, interplanar spacing d(002) determined by X-ray diffraction: 0.337 nm), which was an amorphous/non-crystalline carbon material, and 0.7 parts by mass of carboxymethyl cellulose (CMC), which was a non-rubber binder, were mixed in a powder state. After the powder mixture in which the weight ratio of CMC to AB was 10% by mass was obtained, water was added in such an amount that the solids content was 6.5% by mass, and the resulting mixture was then mixed using a homogenizer ("FILMIX" available from PRIMIX Corporation) at a peripheral speed of 40 m/s. To the mixture were added 93 parts by mass of graphite powder and water in such an amount that the solids content was 50% by mass. The resulting mixture was mixed using a homogenizer ("Homogenizing Disper" available from PRIMIX Corporation) at a peripheral speed of 1.5 m/s. Subsequently, 0.4 parts by mass of styrene-butadiene rubber (SBR) was added as a rubber-based binder and mixed using Homogenizing Disper similarly to prepare a negative electrode mixture slurry. A negative electrode was produced in the same manner (negative electrode production method C) as that in Experimental Example 1 except that the negative electrode mixture slurry was produced in this way. The binder coverage ratio of the negative electrode produced by the negative electrode production method C was 0.26. A laminate-type non-aqueous electrolyte secondary battery (test cell A2) was produced using the negative electrode. The result of the output-characteristics test for the test cell A2 is shown in Table 4.

Experimental Example 9

In production of a negative electrode mixture slurry, 7 parts by mass of acetylene black (AB) (average particle size of primary particles determined by SEM: 100 nm, interplanar spacing d(002) determined by X-ray diffraction: 0.337 nm), which was an amorphous/non-crystalline carbon material, and 0.7 parts by mass of carboxymethyl cellulose (CMC), which was a non-rubber binder, were mixed in a powder state. After the powder mixture in which the weight ratio of CMC to AB was 10% by mass was obtained, water was added in such an amount that the solids content was 25% by mass, and the resulting mixture was then mixed using Homogenizing Disper at a peripheral speed of 1.2 m/s. In addition to the mixture containing AB and CMC, a mixture containing graphite powder and SBR was produced by mixing 93 parts by mass of graphite powder, 0.4 parts by mass of SBR, and water using Homogenizing Disper at peripheral speed of 1.2 m/s. The amount of water was such that the solids content was 55% by mass. A negative electrode mixture slurry was prepared by mixing these two mixtures using Homogenizing Disper at a peripheral speed of 1.5 m/s. A negative electrode was produced in the same manner (negative electrode production method D) as that in Experimental Example 1 except that the negative electrode mixture slurry was produced in this way. The binder coverage ratio of the negative electrode produced by the negative electrode production method D was 0.16. A laminate-type non-aqueous electrolyte secondary battery (test cell A3) was produced using the negative electrode. The result of the output-characteristics test for the test cell A3 is shown in Table 4. Table 4 also contains the results of Experimental Example 1 and Experimental Example 3.

As shown in Table 4, non-aqueous electrolyte secondary batteries in which the binder coverage ratio in the negative electrode differs can be produced depending on the method for preparing a negative electrode mixture slurry. For the test cells A1 to A3 in which the binder coverage ratio is 0.50 or less, the resistance at room temperature can be reduced although the positive electrode contains $Li_3PO_4$ and the negative electrode contains the amorphous/non-crystalline carbon material. In particular, in the case of the method for producing the test cell A2 in which the amorphous/non-crystalline carbon material and the non-rubber binder are mixed at a high shear (peripheral speed) in preparation of the negative electrode mixture slurry, the binder coverage ratio is lower than that of the test cell A1, which indicates that the coverage of SBR on the amorphous/non-crystalline carbon material is relatively low. This may be because CMC can be adhered to the surface of the amorphous/non-crystalline carbon material by mixing CMC and the amorphous/non-crystalline carbon material at a higher shear. In the test cell A3 in which the negative electrode mixture slurry was prepared by changing the timing for adding SBR, that is, premixing a graphite material and SBR, the binder coverage ratio is lower than that of the test cell A1, and SBR can be preferentially be adhered to graphite by mixing graphite powder and SBR in the absence of CMC.

As described above, in this embodiment, the resistance of non-aqueous electrolyte secondary batteries at room temperature can be reduced to improve output characteristics.

INDUSTRIAL APPLICABILITY

The present disclosure is applied to non-aqueous electrolyte secondary batteries.

The invention claimed is:

1. A non-aqueous electrolyte secondary battery comprising a non-aqueous electrolyte and an electrode body in which a positive electrode plate and a negative electrode plate are layered with a separator interposed therebetween, wherein
    the positive electrode plate contains a positive electrode mixture layer, the positive electrode mixture layer comprises a positive electrode active material and a phosphate compound in an amount of 0.1% to 15% by mass to a total weight of the positive electrode active material,
    the negative electrode plate contains a graphite-based material, an amorphous/non-crystalline carbon conductive material, and a rubber-based binder, and
    a ratio of a coverage of the rubber-based binder on the amorphous/non-crystalline carbon material to a cov-

TABLE 4

|  | Test Cell No. | Positive Electrode phosphate compound | Negative Electrode amorphous/non-crystalline carbon material | production method | binder coverage ratio | Battery Characteristics difference in resistance mΩ |
|---|---|---|---|---|---|---|
| Experimental Example 1 | A1 | present | acetylene black | A | 0.30 | −30 |
| Experimental Example 8 | A2 | present | acetylene black | C | 0.26 | −36 |
| Experimental Example 9 | A3 | present | acetylene black | D | 0.16 | −43 |
| Experimental Example 3 | B2 | present | absent | A | — | (reference) | erage of the rubber-based binder on the graphite-based material is more than 0 and 0.5 or less.

2. The non-aqueous electrolyte secondary battery according to claim 1, wherein the ratio of the coverage of the rubber-based binder on the amorphous/non-crystalline carbon material to the coverage of the rubber-based binder on the graphite-based material is more than 0 and 0.3 or less.

3. The non-aqueous electrolyte secondary battery according to claim 1, wherein the phosphate compound is lithium phosphate.

4. The non-aqueous electrolyte secondary battery according to claim 1, wherein the positive electrode mixture layer contains tungsten oxide in an amount of 0.01 to 5% by mass to the total weight of the positive electrode active material.

5. The non-aqueous electrolyte secondary battery according to claim 1, wherein the amorphous/non-crystalline carbon material has an interplanar spacing d(002) of 0.350 to 0.340.

6. The non-aqueous electrolyte secondary battery according to claim 1, wherein the positive electrode active material comprises tungsten.

* * * * *